(No Model.)
J. V. & H. H. SHERRIN.
ACCUMULATOR BATTERY.
No. 588,189. Patented Aug. 17, 1897.
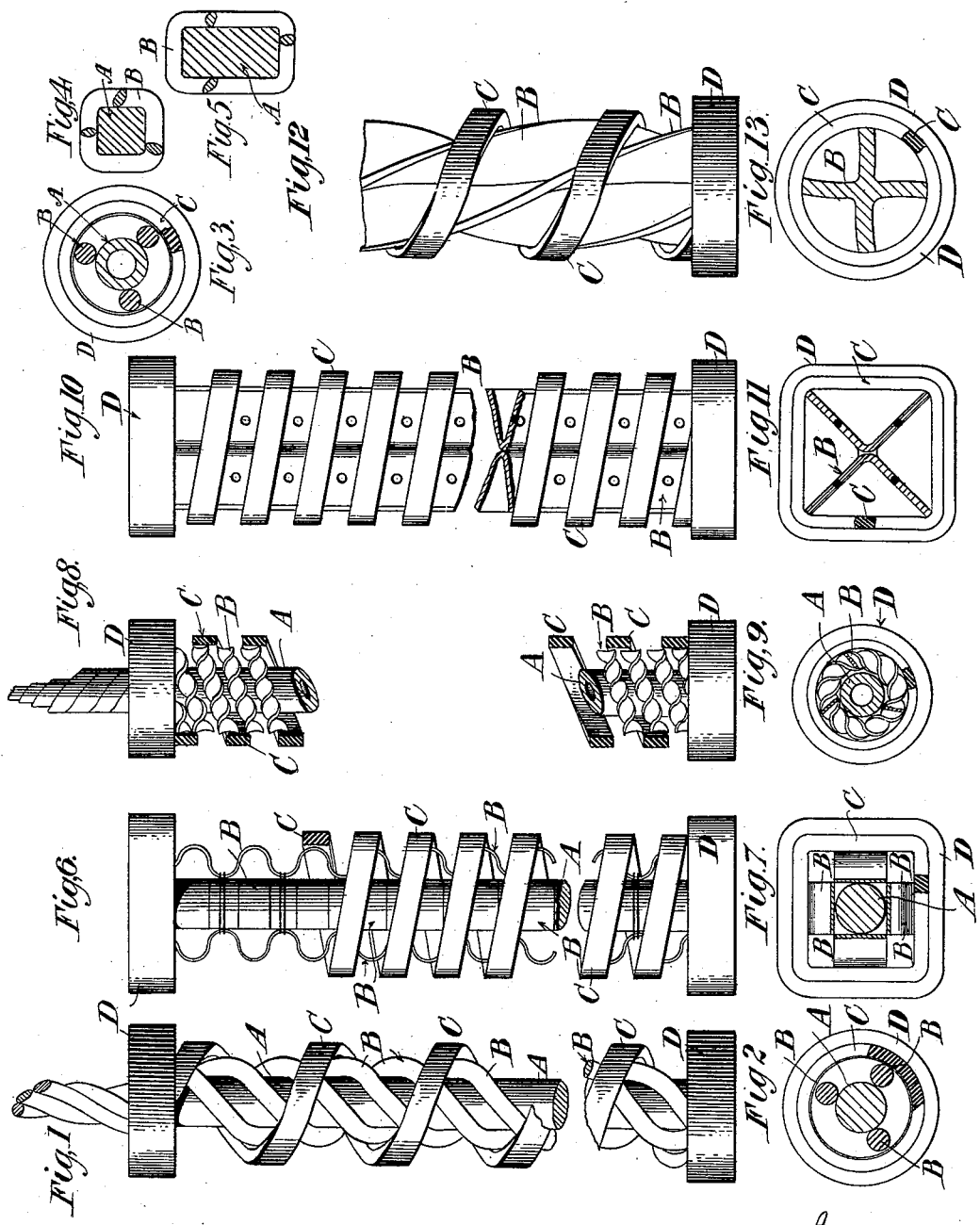

UNITED STATES PATENT OFFICE.

JOHN VAUGHAN SHERRIN AND HENRIETTA HELENA SHERRIN, OF LONDON, ENGLAND.

ACCUMULATOR-BATTERY.

SPECIFICATION forming part of Letters Patent No. 588,189, dated August 17, 1897.

Application filed March 22, 1897. Serial No. 628,742. (No model.)

*To all whom it may concern:*

Be it known that we, JOHN VAUGHAN SHERRIN and HENRIETTA HELENA SHERRIN, subjects of the Queen of Great Britain and Ireland, and residents of Ramsgate, London, in the county of Kent, England, have invented certain new and useful Improvements in Accumulator-Batteries, of which the following is a specification.

According to these improvements each element is in the form of a bar and consists of an inner solid or tubular core, by preference of ebonite, vulcanite, celluloid, or other suitable non-conducting material, a lead conductor strip or strips or wires wound helically around the core, and an outer strip wound helically around the lead strip or strips, but in the opposite direction, this outer strip being of ebonite, celluloid, vulcanite, or other suitable non-conducting material. The active material is deposited into the interstices of the bar thus formed and then compressed, which latter in the case of a round bar may be done by repeatedly rolling the bar upon a flat board. If the bar is square or rectangular in cross-section, it is placed in an open mold and the active material is pressed in with a trowel. The outer ebonite helix may be wound on readily while under the softening influence of a jet of steam.

Figures 1 to 13 are more or less enlarged views of elements of this kind. Fig. 1 is a side view, and Fig. 2 a plan section, of such an element. Fig. 3 is a plan section showing a hollow core. Fig. 4 is a plan section showing a square core. Fig. 5 is a plan section showing a rectangular core. Fig. 6 is a part sectional elevation, and Fig. 7 a plan section, of an element with square or round core and four lead conductors of a crimped form. Fig. 8 is a part sectional elevation, and Fig. 9 a plan section, of an element with round hollow core and helically wound and twisted conductors. Fig. 10 is a part sectional elevation, and Fig. 11 a plan section, of an element with a cross-shaped conductor. Fig. 12 is a part elevation, and Fig. 13 a plan section, of an element with cross-shaped twisted conductor.

The round core A, Figs. 1 and 2, is of ebonite, celluloid, vulcanite, or other suitable non-conducting material, around which are helically wound three lead wires B, which are twisted together or otherwise united at the top. Around these wires is helically wound in the opposite direction a strip C of ebonite or other suitable non-conducting material, fixed to the core at top or bottom, and the interstices between the wires B and the strip C contain the active material flush with the outside of the strip C. The core A may, as shown in Fig. 3, be hollow instead of solid and may be provided with perforations to afford interior access of the electrolyte, and it may be of square or rectangular section, as shown in Figs. 4 and 5, instead of round.

A ring D, of rubber or the like, may be placed or molded around the element at top and a ring or cap, of rubber or the like, at bottom to insulate it from its adjoining elements having active material of opposite polarity, or each element may be lapped round helically with asbestos yarn or tape. (Not shown.) The same means of insulation may be used for the bars hereinafter described and shown.

Fig. 6 is a side view, and Fig. 7 a plan section, of an element having a core A, of round vulcanite, (or of any other of the forms just described.) Upon the core are tied by means of thin lead wire four strips B of crimped lead, and around them is wound the ebonite strip C.

Fig. 8 is a side view, and Fig. 9 a plan section, of another form of element in which the vulcanite core A has wound helically around it curled lead strips B and around these the ebonite strip C.

Fig. 10 is a side view, and Fig. 11 a plan section, of another form in which the non-conducting core is omitted and the conductor B is made of L-section doubled up—*i. e.*, bent upon itself so that the edges of the angle coincide—so as to form + section, around which the ebonite C is wound. The conductor may be provided with perforations and made crinkled or crimped.

Fig. 12 is a side view, and Fig. 13 a plan section, of another form in which a cross-shaped helically-twisted conductor B is used.

Although only a few samples of the invention are shown, it must be understood that the helically-wound strip of ebonite C may be employed as surrounding any suitable form of lead conductor with or without non-conducting core.

It will be understood that the ebonite spring C, while permitting the expansion of the active material, (which latter, then, is, so to say, the master,) has also the very important office of following up and holding together the active material during its contraction, (the spring C being then the master.) We thus insure perfect intimate contact between the active material and the conductor or conductors at all times, and this we believe is a perfectly novel action and practical technical effect, so that even if short-circuiting should take place the battery will after such rough treatment be as effective as before. The active material will not shake loose by reason of heavy shocks or oscillations, and the battery is therefore particularly useful for motor-vehicles. A number of positive elements and negative elements of this kind are combined to make up a battery, or a number of such positive elements or negative elements may be combined, respectively, with negative elements or positive elements of any known plate, bar, or other form.

Accumulators made with the bars described are capable of a heavy discharge without sensible drop on the voltage. The active material is well distributed throughout while presenting a comparatively large surface to the action of the electrolyte. It is also well keyed together, and the important advantage is gained that it is not liable to destructive buckling, as a sufficient amount of longitudinal expansion is rendered possible. Moreover, the lead conductor, owing to its form, presents a comparatively large surface in contact with the active material in all its parts while not in contact with the electrolyte.

Having now described our invention, what we claim as new, and desire to secure by Letters Patent, is—

1. In a secondary-battery element the combination of a conductor, a strip of springy non-conducting material wound helically thereon, and interstitial active material which is held in close contact with the conductor by the said strip during and after expansion and during and after contraction substantially as set forth.

2. In a secondary-battery element the combination of a core, conductors helically wound thereon, a strip of springy non-conducting material helically wound on the conductors in the opposite direction, and interstitial active material, substantially as set forth.

JOHN VAUGHAN SHERRIN.
HENRIETTA HELENA SHERRIN.

Witnesses:
FRED C. HARRIS,
T. JENSEN.